(12) United States Patent
Bretzigheimer et al.

(10) Patent No.: US 9,014,921 B2
(45) Date of Patent: Apr. 21, 2015

(54) METHOD AND SYSTEM FOR REGULATING DRIVING STABILITY

(75) Inventors: Kai Bretzigheimer, Aschaffenburg (DE); Daniel Förster, Darmstadt (DE); Ning Bian, Frankfurt am Main (DE); Andreas Hartmann, Aβmannshardt (DE); Thorsten Staab, Waldaschaff (DE)

(73) Assignee: Continental Teves AG & Co. oHG (DE)

( * ) Notice: Subject to any disclaimer, the term of this patent is extended or adjusted under 35 U.S.C. 154(b) by 117 days.

(21) Appl. No.: 13/814,821

(22) PCT Filed: Aug. 10, 2011

(86) PCT No.: PCT/EP2011/063798
§ 371 (c)(1),
(2), (4) Date: Mar. 18, 2014

(87) PCT Pub. No.: WO2012/020069
PCT Pub. Date: Feb. 16, 2012

(65) Prior Publication Data
US 2014/0288785 A1    Sep. 25, 2014

(30) Foreign Application Priority Data

Aug. 10, 2010  (DE) .......................... 10 2010 039 126
Mar. 4, 2011   (DE) .......................... 10 2011 005 089
Mar. 4, 2011   (DE) .......................... 10 2011 005 090

(51) Int. Cl.
*B60R 22/00*    (2006.01)
*B60Q 1/00*     (2006.01)
*B60T 7/20*     (2006.01)
*B60T 8/1755*   (2006.01)

(52) U.S. Cl.
CPC ....... *B60T 8/17558* (2013.01); *B60T 2201/022* (2013.01); *B60T 2220/03* (2013.01); *B60T 2201/03* (2013.01)

(58) Field of Classification Search
USPC ............................................ 701/48; 340/435
See application file for complete search history.

(56) References Cited

U.S. PATENT DOCUMENTS 6,226,593 B1    5/2001  Kurz et al.
2002/0128760 A1*  9/2002  Bodie et al. ...................... 701/37
(Continued)

FOREIGN PATENT DOCUMENTS

DE    199 00 314    7/2000
DE    101 19 907    10/2002
(Continued)

OTHER PUBLICATIONS

International Search Report corresponding to application PCT/EP2011/063798 dated Nov. 8, 2011.
(Continued)

*Primary Examiner* — Thomas G Black
*Assistant Examiner* — Tyler Paige
(74) *Attorney, Agent, or Firm* — RatnerPrestia

(57) ABSTRACT

A method in which the driving behavior of a vehicle is influenced as a function of data on the surroundings in order to assist an avoidance maneuver, as soon as a risk of a collision is detected on the basis of the data from one or more environment sensors, in particular radar sensors and/or cameras, and the data from one or more vehicle sensors, in particular a steering angle sensor and/or yaw rate sensor and/or wheel speed sensors, and the vehicle has an electronically controlled brake system which permits a driver-independent buildup and modulation of the braking forces at the individual wheels of the vehicle, wherein when a risk of a collision is detected, in a first phase a turning-in operation by the driver is assisted and/or in a second phase a steering operation by the driver is damped. Furthermore, an electronic control unit for a brake system is defined.

16 Claims, 2 Drawing Sheets

(56) References Cited

U.S. PATENT DOCUMENTS

| | | | |
|---|---|---|---|
| 2004/0193374 A1* | 9/2004 | Hac et al. | 701/301 |
| 2005/0029754 A1 | 2/2005 | Ueno et al. | |
| 2005/0134440 A1* | 6/2005 | Breed | 340/435 |
| 2005/0206229 A1* | 9/2005 | Lu et al. | 303/123 |
| 2005/0267660 A1* | 12/2005 | Fujiwara et al. | 701/41 |
| 2008/0319610 A1 | 12/2008 | Oechsle et al. | |
| 2012/0065861 A1 | 3/2012 | Hartmann et al. | |
| 2012/0283910 A1* | 11/2012 | Lee et al. | 701/41 |

FOREIGN PATENT DOCUMENTS

| | | |
|---|---|---|
| DE | 10 2004 033 900 | 7/2005 |
| DE | 10 2005 003 274 | 7/2006 |
| DE | 10 2006 042 666 | 3/2008 |
| DE | 10 2008 005 305 | 7/2009 |
| DE | 10 2008 016 377 | 10/2009 |
| DE | 10 2008 040 241 | 1/2010 |
| DE | 10 2010 028 384 | 11/2010 |
| EP | 1 251 051 | 10/2002 |
| EP | 2 006 181 | 12/2008 |
| WO | WO 2004/074059 | 9/2004 |
| WO | WO 2007/031578 | 3/2007 |

OTHER PUBLICATIONS

German Search Report corresponding to application DE 10 2011 080 789.6, Mar. 16, 2012.

* cited by examiner

METHOD AND SYSTEM FOR REGULATING DRIVING STABILITY

CROSS REFERENCE TO RELATED APPLICATIONS

This application is the U.S. National Phase Application of PCT International Application No. PCT/EP2011/063798, filed Aug. 10, 2011, which claims priority to German Patent Application No. 10 2010 039 126.3, filed Aug. 10, 2010, German Patent Application No. 10 2011 005 089.2, filed Mar. 4, 2011 and German Patent Application No. 10 2011 005 090.6, filed Mar. 4, 2011, the contents of such applications being incorporated by reference herein.

FIELD OF THE INVENTION

The invention relates to a method in which the driving behavior of a vehicle is influenced as a function of data on the surroundings in order to assist an avoidance maneuver, as soon as a risk of a collision is detected on the basis of the data from one or more environment sensors, selected from the group consisting of radar sensors and cameras, and the data from one or more vehicle sensors, selected from the group consisting of a steering angle sensor, a yaw rate sensor and wheel speed sensors, wherein the vehicle has an electronically controlled brake system which permits a driver-independent buildup and modulation of the braking forces at the individual wheels of the vehicle, wherein when a risk of a collision is detected, in a first phase a turning-in operation by the driver is assisted and/or in a second phase a steering operation by the driver is damped and to an electronic control unit according to which receives information of one or more environment sensors, selected from the group consisting of radar sensors and cameras, and is connected to one or more vehicle sensors, selected from the group consisting of a steering angle sensor, a yaw rate sensor, and wheel speed sensors, and which can bring about, by actuating actuators, a driver-independent buildup and modulation of the braking forces at the individual wheels of the vehicle.

BACKGROUND OF THE INVENTION

In addition to electronically controlled brake systems which make available functions such as a brake slip control system (ABS) which prevents the wheels locking during full braking, and a vehicle movement dynamics control system (ESC) which acts in a stabilizing fashion on the motor vehicle during dynamic driving maneuvers by means of selective braking interventions, motor vehicles increasingly have an environment sensor system with which other road users and nonmovable obstacles are detected and the positions and speeds thereof with respect to the driver's own vehicle can be determined.

The networking of the environment sensor system with an electronically controlled brake system permits the distance from the motor vehicle traveling ahead to be controlled (ACC), a warning to be issued to the driver when particularly critical situations occur and automatic initiation of an emergency braking operation when there is a risk of a collision. In order to avoid incorrect interventions, such an emergency braking assistant (EBA) is only allowed to engage late, i.e. at the smallest possible distance from the obstacle, as a result of which in many situations a collision with the obstacle or the other road user by simply braking can only be attenuated and not avoided despite this driver assistance.

There are various reasons for this:
Maintaining an ideal distance from the vehicle traveling ahead is not practical in dense traffic.
An oncoming vehicle is overlooked at the start of an overtaking maneuver.
The distance calculation of the driver assistance system assumes that the coefficient of friction is that of a planar and dry roadway, with the braking distance being longer on a slippery roadway than the distance from the engagement point.

In order to prevent a collision an avoidance maneuver is therefore frequently necessary in addition to the braking operation. Furthermore, in many situations a collision can be prevented by means of an avoidance maneuver, even without braking. Many drivers experience such an emergency avoidance situation very rarely and when they suddenly come across an obstacle they react intuitively with an excessively dynamic steering input.

At high speeds this can lead to violent vehicle reactions, in particular during the subsequent steering back.

For this reason, systems have already been developed which assist the driver during an avoidance maneuver even without an environment sensor system. DE 101 19 907 B4, which is incorporated by reference, therefore discloses a method for controlling the driving stability in which during stable cornering it is determined whether there is a tendency towards subsequent unstable driving behavior on the basis of a steering angle speed and a measured lateral acceleration. In this case, a braking pre-engagement already takes place during stable driving behavior, wherein the braking pre-engagement is ended if at least one change of direction of a yaw rate is detected after a yaw rate maximum and a model-based lateral acceleration is equal to or lower than a limiting value.

A further development of the method is disclosed in WO 2004/074059, which is incorporated by reference. In this context, a driving situation senses characteristic variables and determines a driver reaction therefrom. If a critical driving situation is to be expected on the basis of the expected driving behavior, braking interventions and/or engine interventions are already performed during stable driving behavior. The interventions are performed as a function of an expected lateral acceleration which contains the theoretical lateral acceleration which the vehicle will have in the future if the driver continues to turn in or turn out with a uniform steering angle speed. The described methods can damp excessively violent steering maneuvers of the driver and therefore avoid skidding or tipping over of the vehicle, but the avoidance of incorrect interventions presents a problem. If the driver steers too hesitantly this can lead to a partial coverage collision.

DE 10 2010 028 384 A1, which is incorporated by reference, discloses a method for closed-loop and/or open-loop control of the driving stability of a vehicle and avoiding collisions with an object located in the lane. On the basis of environment signals it is determined whether a situation critical in terms of vehicle movement dynamics, in particular an imminent collision, is present, and when a critical situation is present an avoidance path is determined. Furthermore, pressures for individual brakes of the vehicle are determined on the basis of a plurality of input variables, and preparatory measures of the vehicle movement dynamics controller such as dynamic switching over of control parameters are activated if the situation which is critical in terms of vehicle movement dynamics is present. In one preferred embodiment of the invention, a setpoint steering angle, which is set by means of an active steering system, is determined on the basis of the determined avoidance path. An autonomous steering intervention is critical in terms of product liability and acceptance by the driver.

SUMMARY OF THE INVENTION

An aspect of the present invention is to make available assistance to the driver during an avoidance maneuver in a way which avoids the specified disadvantages.

This is achieved by means of a method in which the driving behavior of a vehicle is influenced as a function of data on the surroundings in order to assist an avoidance maneuver, as soon as a risk of a collision is detected on the basis of the data from one or more environment sensors, selected from the group consisting of radar sensors and cameras, and the data from one or more vehicle sensors, selected from the group consisting of a steering angle sensor, a yaw rate sensor and wheel speed sensors, wherein the vehicle has an electronically controlled brake system which permits a driver-independent buildup and modulation of the braking forces at the individual wheels of the vehicle, wherein when a risk of a collision is detected, in a first phase a turning-in operation by the driver is assisted and/or in a second phase a steering operation by the driver is damped and an electronic control unit which receives information of one or more environment sensors, selected from the group consisting of radar sensors and cameras, and is connected to one or more vehicle sensors, selected from the group consisting of a steering angle sensor, a yaw rate sensor, and wheel speed sensors, and which can bring about, by actuating actuators, a driver-independent buildup and modulation of the braking forces at the individual wheels of the vehicle, wherein the electronic control unit carries out a method comprising the driving behavior of a vehicle being influenced as a function of data on the surroundings in order to assist an avoidance maneuver, as soon as a risk of a collision is detected on the basis of the data from one or more environment sensors and the data from one or more vehicle sensors, wherein the vehicle has an electronically controlled brake system which permits a driver-independent buildup and modulation of the braking forces at the individual wheels of the vehicle, wherein when the risk of a collision is detected, in a first phase a turning-in operation by the driver is assisted and/or in a second phase a steering operation by the driver is damped.

A method is therefore made available in which the driving behavior of a vehicle is influenced as a function of data on the surroundings in order to assist an avoidance maneuver, as soon as a risk of a collision is detected on the basis of the data from one or more environment sensors, in particular radar sensors and/or cameras, and the data from one or more vehicle sensors, in particular a steering angle sensor and/or yaw rate sensor and/or wheel speed sensors, wherein the vehicle has an electronically controlled brake system which permits a driver-independent buildup and modulation of the braking forces at the individual wheels of the vehicle. According to the invention, when a risk of a collision is detected, in a first phase a turning-in operation by the driver is assisted and/or in a second phase a steering operation by the driver is damped.

Since modern vehicles are often equipped with a system for controlling the vehicle movement dynamics such as an ESC, the execution of the method according to the invention merely requires one long-range sensor, such as a radar sensor or Lidar sensor, pointing in the direction of travel. The method according to the invention can therefore be implemented cost-effectively. Since in a first phase a turning-in operation of the vehicle is assisted, the vehicle can already achieve a lateral offset, sufficient for avoidance, at the largest possible distance from the obstacle, as a result of which the risk of an impact with partial coverage is minimized. Expediently, in a second phase further steering in the avoidance direction is already damped before the driver steers back, as a result of which excess steering back of the driver can be avoided, which steering back greatly increases a risk of tipping and/or skidding in conjunction with a rolling movement of the vehicle. On the other hand, if the driver steers back too quickly, the driving stability can be ensured by suitable braking intervention even in this situation.

In the first phase, an additional yaw moment in the avoidance direction is preferably built up by means of braking interventions, in particular a reduction in the braking force at the front wheel on the outside bend or a buildup of braking force at one or more wheels on the inside of the bend. If one or more wheels of the vehicle are undergoing a brake slip control operation and the vehicle is therefore being fully braked, no additional longitudinal forces can be transmitted any more from the tires to the road. By selective reduction of the braking force at one or more wheels, a suitable additional yaw moment can be generated even in this case. If, on the other hand, the existing coefficient of friction is not yet being used to an optimum degree, an additional buildup of braking force at one or more wheels on the inside of the bend can generate the additional yaw moment which is required for the avoidance maneuver and can additionally further reduce the braking distance up to the stationary state of the vehicle.

In the second phase, an additional yaw moment is preferably built up counter to the avoidance direction by means of braking interventions, in particular at the front wheel on the outside of the bend. Since a steering movement of the driver is damped in the avoidance direction, the risk of subsequent excessively dynamic steering back, which can lead to skidding and to tipping over, in particular in vehicles with a high center of gravity, is reduced.

In order to build up an additional yaw moment a request is expediently made to a vehicle movement dynamics control system, in particular an ESC system. Since an ESC system which is known per se already has a suitable distribution logic which suitably selects, as a function of the driver's brake pressure, the changes in braking force (for example buildup of brake pressure or reduction in brake pressure) which are required to build up an additional yaw moment, avoidance assistance can, as a result, be implemented particularly easily.

It is advantageous if the steering operation by the driver is damped only when the vehicle speed exceeds a speed threshold value. At low vehicle speeds, the risk of the vehicle skidding or tipping is lower, whereas a larger steering movement is necessary to achieve a sufficient lateral offset.

The turning-in operation by the driver is preferably assisted only when the steering angle speed undershoots a steering threshold value. If the driver turns in very frequently, additional steering assistance would endanger the driving stability without being necessary with respect to the lateral offset.

The damping of a steering movement of the driver preferably takes place as a function of a measured lateral acceleration and/or a measured yaw rate and/or an estimated coefficient of friction. If it is ensured that the measured lateral acceleration remains below a threshold value which is determined on the basis of the driving properties of the vehicle, tipping over of the vehicle can be prevented. Known vehicle movement dynamics controllers have means for estimating the coefficient of friction with the result that it is possible, on the basis of the coefficient of friction which is, in particular, estimated in the first phase, to calculate which yaw rate can be achieved without exceeding the forces which can be transmitted.

In order to damp a steering movement of the driver in the case of a system controlling the slip angle speed, a threshold value for the activation is lowered and/or boosting is expediently increased. Vehicle movement dynamics controllers which are known per se frequently have a system for controlling the slip angle speed. The buildup of an excessively high slip angle with corresponding endangerment of the driving stability can be prevented by limiting the slip angle speed and/or strongly suppressing deviations from the setpoint value.

It is advantageous if in the case of a system for a yaw rate control a threshold value for the activation is lowered and/or boosting is increased. The threshold value for activating a yaw rate control is usually given an extremely high setting in order to avoid incorrect interventions. If a critical situation is detected on the basis of the environment sensor system, it is therefore advantageous to lower the threshold value and/or to increase boosting in order to more quickly achieve a stable driving state again.

According to one preferred embodiment of the invention, when a risk of a collision is detected the time of the start of the first phase is determined on the basis of a detected steering movement of the driver. Since the first phase is initiated with a steering movement of the driver, an intervention which influences the direction of travel of the vehicle does not take place without a corresponding driver's request.

According to one preferred embodiment of the invention, the time of the start of the second phase is determined on the basis of a consideration of the integrated yaw rate and of the required lateral offset. The required lateral offset can be determined on the basis of the environment sensor system (for example half the width of the obstacle plus half the width of the vehicle plus, if appropriate, a predefined safety distance), and by estimating the achieved lateral offset by means of the yaw rate integrated over time it is possible to detect whether a sufficient lateral offset has been achieved and therefore further turning in of the driver would only endanger the driving stability.

According to one alternative preferred embodiment of the invention, a suitable avoidance trajectory is calculated, in particular at the time of the start of the first phase. While this requires relatively high computation complexity, suitable intervention times and/or the required yaw rate can be determined particularly precisely on the basis of the instantaneous position and the driving state of the vehicle.

According to one particularly preferred embodiment of the invention, a required yaw rate is determined as a function of the calculated avoidance trajectory, and in particular the strength of the damping of a steering movement of the driver is selected in accordance with the required yaw rate. On the basis of the detected avoidance trajectory, the driving maneuver can be carried out as gently as possible (with low lateral acceleration).

According to one particularly preferred embodiment of the invention, an optimum deviation time is calculated on the basis of a consideration of the integrated yaw rate and of the required lateral offset or of a calculated avoidance trajectory, and in a third phase a steering operation of the driver in the avoidance direction is damped even more greatly after the optimum deviation time has been exceeded. If it is detected that the driver has missed the optimum deviation time, particularly strong damping of the yaw rate can increase the driving safety.

It is advantageous if, on the other hand, a brake slip control system is modified to the effect that the longitudinal forces are reduced in favor of relatively large lateral forces as soon as a steering movement of the driver takes place. If the driver decides that in the present situation a collision can be avoided better by avoidance than by pure full braking without a steering movement, a slightly increased braking distance is expediently accepted in favor of significantly improved steerability.

Furthermore, the invention relates to an electronic control unit, in particular an electronic brake control unit, which receives information of one or more environment sensors, in particular radar sensors and/or cameras, and is connected to one or more vehicle sensors, in particular a steering angle sensor and/or yaw rate sensor and/or wheel speed sensors, and which can bring about, by actuating actuators, a driver-independent buildup and modulation of the braking forces at the individual wheels of the vehicle. According to the invention, a control unit carries out a method as claimed in at least one of the preceding claims.

BRIEF DESCRIPTION OF THE DRAWINGS

The invention is best understood from the following detailed description when read in connection with the accompanying drawings. Included in the drawings is the following figures.

In the drawing.

DETAILED DESCRIPTION OF THE PREFERRED EMBODIMENTS

Figure 1:
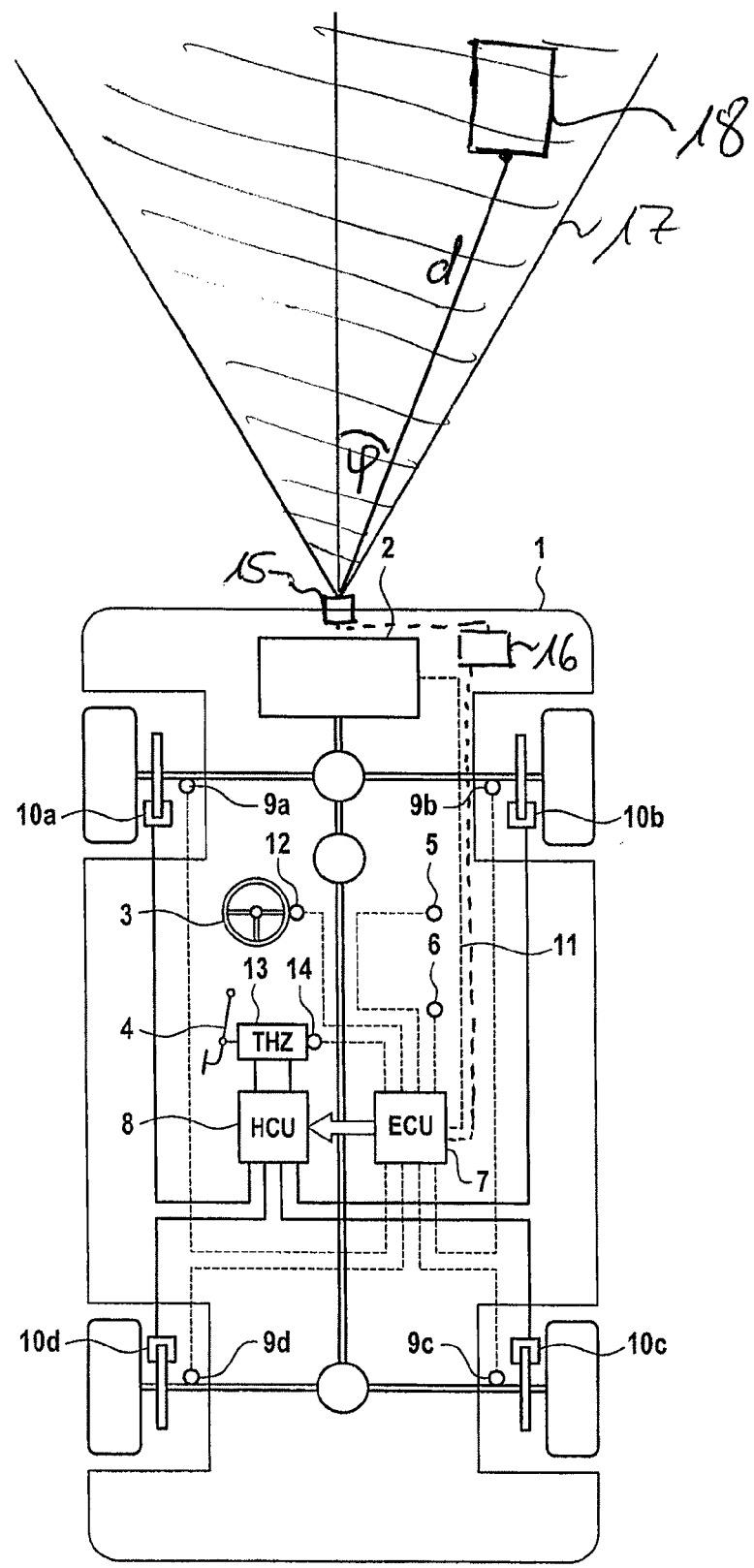
FIG. 1 shows a motor vehicle which is suitable for carrying out the method.

FIG. 1 shows a schematic illustration of a motor vehicle 1 which is suitable for carrying out the method according to an aspect of the invention. Said motor vehicle 1 has a drive engine 2, which drives at least some of the wheels of the vehicle, a steering wheel 3, a brake pedal 4, which is connected to a tandem master cylinder (THZ) 13, and four wheel brakes 10a-10d which can be actuated individually. The method according to the invention can be carried out even if only some of the vehicle wheels are being driven. In addition to or as an alternative to hydraulic wheel brakes, friction brakes which are activated electromechanically at one wheel, at a plurality of wheels or at all the wheels can be used as wheel brakes. According to one alternative embodiment of the invention, the vehicle has an electric drive and the braking torque at at least one wheel is generated at least partially by the electric machine/machines which are operated as a generator.

A steering wheel angle sensor 12 for measuring the steering angle $\delta$, four wheel speed sensors 9a-9d for measuring the wheel speeds $V_i$ of the individual wheels, a lateral acceleration sensor 5 for measuring the lateral acceleration $a_{Lat}$, a yaw rate sensor 6 for measuring the yaw angle speed $\dot{\Psi}$, also referred to as the yaw rate, and at least one pressure sensor 14 for measuring the brake pressure p, generated by the brake pedal and the tandem master cylinder (THZ) are provided for sensing vehicle movement dynamics states. In this context, the pressure sensor 14 can also be replaced by a pedal travel sensor or pedal force sensor if the auxiliary pressure source is arranged in such a way that a brake pressure which is built up by the driver cannot be differentiated from that of the auxiliary pressure source or an electromechanical brake actuator with a known relationship between the pedal position and the braking torque is used. The signals of the wheel sensors are fed to an electronic control unit (ECU) 7 which determines the vehicle speed $v_{Ref}$ from the wheel speeds $V_i$ on the basis of predefined criteria.

The ECU (the electronic control unit) 7 receives the data of the sensors described above as well as that of possibly present further sensors and controls the hydraulic unit (HCU) 8 to permit a buildup or a modulation of the brake pressure at the individual wheel brakes independently of the driver. In addition, the driving torque which is generated at that particular time by the drive motor 2 and the torque which is desired by the driver are determined. This may also involve indirectly determined variables which are derived, for example, from an engine characteristic diagram and transmitted to the ECU 7 via an interface 11, for example a CAN bus or FlexRay bus from the engine control unit (not shown).

The driving behavior of the motor vehicle 1 is influenced significantly by the configuration chassis, wherein, inter alia, the wheel load distribution, the elasticity of the wheel suspension means and tire properties determine the self-steering behavior. In certain driving situations, which are characterized by a predefined desired bend radius and the coefficients of friction between the tire and the roadway, a loss of the driving stability can occur, wherein the steering behavior which is desired by the driver cannot be achieved.

With the existing sensors, the driver's request can be detected and the implementation by means of the vehicle can be checked. The tendency toward a loss of stability is already preferably detected.

The ECU 7 frequently carries out a plurality of methods for controlling the driving stability, wherein arbitration of, under certain circumstances, simultaneously received braking requests takes place. For example, a yaw rate control which compares the measured yaw rate with a model yaw rate frequently takes place. If this difference is above the control entry threshold, the braking intervention starts. The model yaw rate corresponds to the setpoint yaw rate and is formed by a simple vehicle model relating to the steering angle and the vehicle speed. In addition, control of the slip angle speed frequently takes place. This variable is also formed by means of the vehicle model and corresponds in oversteering situations to the speed with which the vehicle turns in or the rear of the vehicle veers out. As soon as a certain threshold for the slip angle speed is exceeded, the braking intervention starts. A brake slip control system, which prevents locking of the wheels during a braking process, is most widespread.

Furthermore, the vehicle 1 has an environment sensor system with at least one environment sensor 15 with which objects in the environment of the vehicle can be sensed, said objects being, in particular, further motor vehicles which are moving on the same lane or on an adjacent lane to the side of and/or in front of the vehicle 1. However, stationary or virtually stationary objects such as, for example, trees, pedestrians or roadway boundary installations are also possible as objects. For example, an environment sensor 15 is shown with a sensing range 17 which comprises a spatial angle in front of the vehicle 1 in which an object 18 is illustrated. The signals of the environment sensor 15 are evaluated by a monitoring computer 16 and corresponding information is made available to the ECU 7. In principle the monitoring computer 16 can, however, also be integrated into the environment sensor 15, and/or the ECU 7 can directly process the sensor signals.

The environment sensor 15 is, for example, a LIDAR (Light Detection and Ranging) sensor which is known per se and which measures the distances d from the sensed points of an object as well as the angles $\phi$ between the connecting straight lines to these points and the central longitudinal axis of the vehicle, as is illustrated in FIG. 1 by way of example for a point of the object 18. The fronts of the detected objects which face the vehicle 1 are composed of a plurality of sensed points to which the sensor signals are transmitted, the correlations between points and the shape of an object are made and a reference point for the object 18 is determined. In this context, for example the center point of the object 18 or the center point of the sensed points of the object can be selected as a reference point. If the speeds of the detected points and therefore the speed of the sensed objects cannot be measured directly, they are preferably calculated from the difference between the distances measured in successive time increments. The acceleration of the objects by deriving their positions twice can basically also be determined in a similar way. The speed of the objects can also be determined, for example, by means of the Doppler effect, in particular if the environment sensor is a radar sensor. In principle, one or more cameras or other environment sensors can also be used.

As explained in the introduction, a collision with an obstacle sometimes cannot be avoided by full braking, even with optimum utilization of the frictional engagement. In such situations, only an avoidance maneuver, such as single or double change of lane, prevents the collision.

Figure 2:
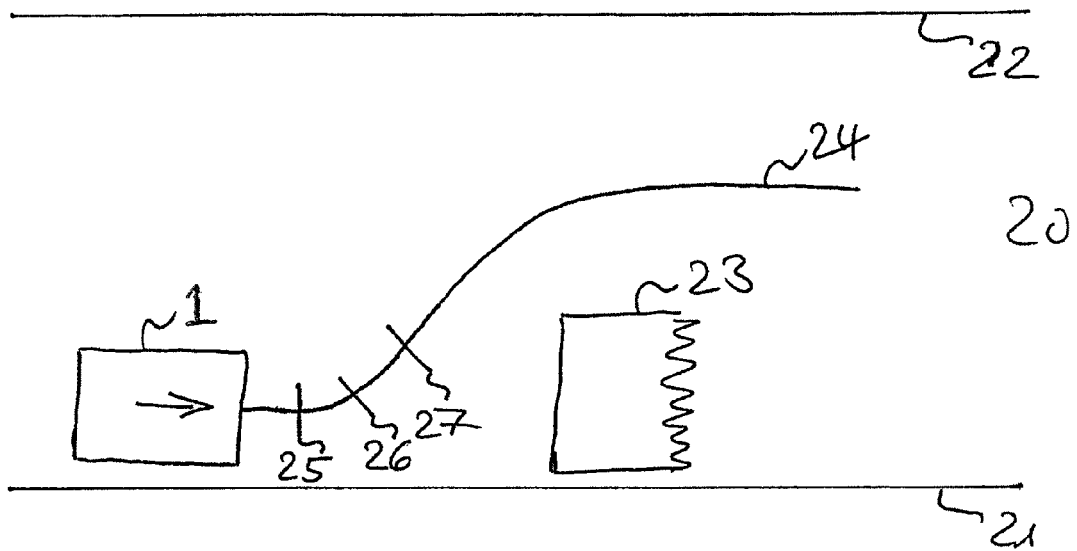
FIG. 2 shows a schematic illustration of an avoidance maneuver.

FIG. 2 shows a schematic illustration of an avoidance maneuver. The vehicle 1 is traveling on a road 20 with a right-hand roadway edge 21 and a left-hand roadway edge 22 towards an obstacle 23, for example a stopping vehicle. In order to avoid a collision, the driver carries out, for example, a single lane change, wherein the vehicle follows the trajectory 24.

Here, at the point 25 the driver starts a steering movement which is assisted by virtue of the fact that an additional yaw moment is built up in the avoidance direction (that is to say the steering angle adopted by the driver) by means of corresponding braking interventions.

In the case of full braking, the longitudinal force at the front wheel on the outside of the bend is expediently lowered by a wheel-specific reduction in brake pressure at the moment at which the driver turns in, with the result that the resulting yaw moment assists the steering presetting of the driver and the vehicle follows said presetting more directly. In the case of partially braked movement, a pressure buildup can advantageously take place at a wheel on the inside of the bend.

In order to avoid a loss of stability due to skidding or tipping over in the case of a high center of gravity of the vehicle, a steering operation by the driver is already damped at point 26, in particular by corresponding braking interventions generating an additional yaw moment counter to the avoidance direction.

During a lane change, an early and intensive stabilization of braking intervention which assists the turning into the second lane expediently occurs after the avoidance maneuver, at the front wheel which is now on the outside of the bend. A yaw rate control according to the prior art still engages at this time at the front wheel which is now on the inside of the bend. After a risk of collision has been detected and the initiation of an avoidance maneuver by the driver, a suitable intervention can be carried out at the optimum time and without the risk of incorrect control processes.

If an optimum deviation time can be determined, in particular by calculating a suitable avoidance trajectory, according to one particularly preferred embodiment of the invention even more intensive yaw damping takes place at point 27, during which yaw damping a steering operation by the driver in the avoidance direction is attenuated by an even greater, opposing yaw moment.

Figure 3:
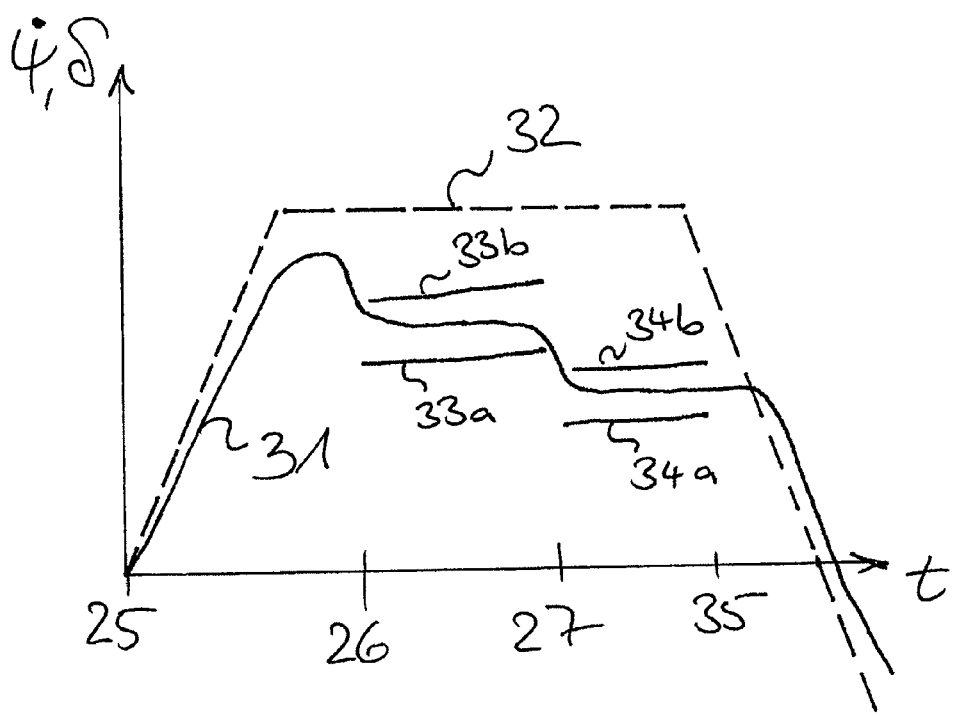
FIG. 3 shows a diagram of the yaw rate.

FIG. 3 shows a diagram of the time profile of the yaw rate and the steering angle during an avoidance maneuver, wherein the yaw rate 31 and the steering angle 32 are therefore illustrated on the ordinate, and the abscissa indicates the time. At the time 25, the driver starts to turn in, after which the yaw rate increases. Since the environment sensor system has detected a risk of collision, a steering movement of the driver is assisted with an additional yaw moment in the avoidance direction. The vehicle therefore quickly reaches a large slip angle and a corresponding lateral offset. If a suitable avoidance course has been achieved on the basis of the integrated yaw rate and the required lateral offset or on the basis of the determined avoidance trajectory, yaw damping already occurs before the steering back of the driver starting from the time 26. If the system detects that the suitable steering back time 27 has been reached or exceeded, even stronger yaw damping expediently occurs, in particular if the driver is not yet steering back, after which an even stronger yaw moment is built up counter to the avoidance direction. If the driver steers back (at the time 35), it is advantageous to end the avoidance assistance. Excessive steering back can be prevented by a vehicle movement dynamics controller which continues to be active, in that, if appropriate, an oversteering intervention takes place.

According to one preferred embodiment of the invention it is possible to predefine an additional yaw moment in an open-loop control operation during the driving maneuver, and in an alternative preferred embodiment of the invention closed-loop control takes place on the basis of predefined lower and upper thresholds 33a, 34a and 33b, 34b. The thresholds of the control are expediently selected as a function of the phase of the avoidance maneuver. If there is no longer any risk of collision anymore and the driver turns in further in order to take a bend, it is advantageous to end the method according to the invention.

During the lane change it is possible, on the one hand, to avoid strong oversteering of the vehicle which would lead to a loss of the driving stability and, on the other hand, to ensure that the vehicle follows the steering presetting of the driver with as little delay as possible. During a lane change, it is important to stabilize the vehicle, in particular for vehicles with a high center of gravity, which, owing to the high dynamics of the maneuver and the limited dynamics of the brake system, requires a prompt start of the braking interventions.

According to the prior art, the control algorithms of the electronic control unit are calibrated as a compromise between avoiding incorrect interventions in noncritical situations and suitable stabilization during lane changes. By means of this compromise, undesirably large slip angles are often obtained during lane change maneuvers, in particular in vehicles with a high center of gravity.

On the basis of the information relating to the traffic situation which is required by means of the environment sensor system, the brake control unit is then expediently adapted to critical situations in order to ensure a prompt start of the braking interventions, while in noncritical situations the brake control unit is set in the customary way.

This is preferably implemented in that the environment sensor system signals the presence of a critical situation via a communication bus (such as CAN or FlexRay). If the electronic control unit receives the signal, in one preferred embodiment of the invention control entry thresholds of the slip angle speed control and yaw rate control are lowered and/or control boosting is increased.

In order to ensure the shortest possible braking distance during a straight-ahead full braking process, the buildup of high longitudinal forces is prioritized over steerability in a brake slip control system according to the prior art. However, this leads to a situation in which large steering angles and steering angle gradients which are too taxing for inexperienced drivers are necessary for the avoidance process.

If it is detected on the basis of distance determined by means of the environment sensor system and the relative speed between the driver's own vehicle and the obstacle that the collision can no longer be avoided by full braking and/or the avoidance by means of the short distance would be possible only with very high steering dynamics, in one preferred embodiment of the invention the steerability is prioritized over the shortest possible braking distance in the brake slip control system. This may take place, in particular, by means of particularly early detection and corresponding reaction to slip onsets at the wheels. As a result, the duration of the slip onsets is reduced and the possibility of building up lateral forces during steering is always provided.

In addition to the risk of an excessively small and excessively late steering intervention which can lead to an impact with a partial offset, there is also the risk of excessive steering endangering the driving stability and causing the vehicle to tip over. At suitable steering times and at adapted steering amplitudes, the obstacle can frequently be safely driven around at a sufficient distance without the driver's own vehicle having to be driven in the region bordering instability.

If a significantly higher lateral acceleration than necessary results according to the assumption that a steering intervention is continued in the way already sensed, a suitable braking intervention is preferably carried out which acts in a damping fashion on the yawing of the vehicle, with the result that when the steering intervention is continued the necessary lateral acceleration or yaw rate occurs. When the time and the absolute value of a yaw moment which damps the steering of the driver are determined, according to one preferred embodiment of the invention a rolling movement is taken into account which leads to more violent vehicle reactions during steering back than during turning in.

Since high yaw rates are necessary for reliably driving around the obstacle at low speeds or when there are short distances from the obstacle, there is expediently no buildup of a damping vehicle yaw moment when these conditions are present.

The described measures ensure that during the avoidance maneuver the vehicle acts in the region bordering instability only in cases which are actually necessary.

The invention claimed is:

1. A method in which the driving behavior of a vehicle is influenced as a function of data on the surroundings in order to assist the vehicle during an avoidance maneuver, the method comprising:

applying by an electronically controlled braking system, in a first phase of the avoidance maneuver when the driver steers the vehicle in a first direction to steer around an obstacle, more braking force to a tire on the inside of a first bend than to a tire on the outside of the first bend as soon as a risk of a collision is detected on the basis of i) data from one or more environment sensors, the one or more environment sensors including at least one of radar sensors and cameras, and ii) data from one or more vehicle sensors, the one or more vehicle sensor including at least one of a steering angle sensor, a yaw rate sensor and wheel speed sensors, in order to assist the driver in steering around the obstacle, applying by the electronically controlled braking system, in a second phase of the avoidance maneuver when after steering around the obstacle in the first phase the driver steers the vehicle in a second direction opposite the first direction, more braking force to the tire on the outside of a second bend than to the tire on the inside of the second bend in order to dampen the driver steering and stabilize the vehicle.

2. The method as claimed in claim 1, wherein in the first phase, an additional yaw moment in the avoidance direction is built up by braking interventions, comprising a reduction in the braking force at the front wheel on the outside bend or a buildup of braking force at one or more wheels on the inside of the bend.

3. The method as claimed in claim 1, wherein in the second phase, an additional yaw moment is built up counter to the avoidance direction by braking interventions, at the front wheel on the outside of the bend.

4. The method as claimed in claim 2, wherein in order to build up an additional yaw moment a request is made to a vehicle movement dynamics control system comprising an ESC system.

5. The method as claimed in claim 1, wherein the steering operation by the driver is damped only when the vehicle speed exceeds a driving speed threshold value.

6. The method as claimed in claim 1, wherein the turning-in operation by the driver is assisted only when the steering angle speed undershoots a steering threshold value.

7. The method as claimed in claim 1, wherein the damping of a steering movement of the driver takes place as a function of at least one of a measured transverse acceleration, a measured yaw rate, and an estimated coefficient of friction.

8. The method as claimed in claim 1, wherein in order to damp a steering movement of the driver in the case of a system controlling the slip angle speed, a threshold value for the activation is lowered and/or boosting is increased.

9. The method as claimed in claim 1, wherein in the case of a system for a yaw rate control a threshold value for the activation is lowered and/or boosting is increased.

10. The method as claimed in claim 1, wherein when a risk of a collision is detected the time of the start of the first phase is determined on the basis of a detected steering movement of the driver.

11. The method as claimed in claim 10, wherein an optimum deviation time is calculated on the basis of a consideration of the integrated yaw rate and of the required lateral offset or of a calculated avoidance trajectory, and in that in a third phase a steering operation of the driver in the avoidance direction is damped even more greatly after the optimum deviation time has been exceeded.

12. The method as claimed in claim 1, wherein the time of the start of the second phase is determined on the basis of a consideration of the integrated yaw rate and of the required lateral offset.

13. The method as claimed in claim 1, wherein a suitable avoidance trajectory is calculated at the time of the start of the first phase.

14. The method as claimed in claim 13, wherein a required yaw rate is determined as a function of the calculated avoidance trajectory, and the strength of the damping of a steering movement of the driver is selected in accordance with the required yaw rate.

15. The method as claimed in claim 1, wherein a brake slip control system is modified to the effect that the longitudinal forces are reduced in favor of relatively large lateral forces as soon as a steering movement of the driver takes place.

16. An electronic brake control unit in a vehicle driven by a driver including:
a processor configured to:
receive environment information from one or more environment sensors, selected from the group consisting of radar sensors and cameras,
receive vehicle information from one or more vehicle sensors, selected from the group consisting of a steering angle sensor, a yaw rate sensor, and wheel speed sensors,
control actuators, to apply more braking force to a tire on the inside of a first bend than to a tire on the outside of the first bend in a first phase of the avoidance maneuver when the driver steers the vehicle in a first direction to steer around an obstacle, in order to assist the driver in steering around the obstacle, and
control actuators, to apply more braking force to the tire on the outside of a second bend than to the tire on the inside of the second bend in a second phase of the avoidance maneuver when after steering around the obstacle in the first phase the driver steers the vehicle in a second direction opposite the first direction, in order to dampen the driver steering and stabilize the vehicle.

* * * * *